(12) United States Patent
Petrovic

(10) Patent No.: US 11,322,749 B2
(45) Date of Patent: May 3, 2022

(54) POROUS POLYMER LITHIUM ANODE

(71) Applicant: Slobodan Petrovic, Happy Valley, OR (US)

(72) Inventor: Slobodan Petrovic, Happy Valley, OR (US)

( * ) Notice: Subject to any disclaimer, the term of this patent is extended or adjusted under 35 U.S.C. 154(b) by 0 days.

(21) Appl. No.: 16/812,291

(22) Filed: Mar. 7, 2020

(65) Prior Publication Data
US 2021/0280849 A1   Sep. 9, 2021

(51) Int. Cl.
| | |
|---|---|
| *H01M 4/66* | (2006.01) |
| *H01M 4/137* | (2010.01) |
| *H01M 4/60* | (2006.01) |
| *H01M 10/052* | (2010.01) |
| *H01M 4/62* | (2006.01) |
| *H01M 4/02* | (2006.01) |

(52) U.S. Cl.
CPC .......... *H01M 4/668* (2013.01); *H01M 4/137* (2013.01); *H01M 4/602* (2013.01); *H01M 4/628* (2013.01); *H01M 10/052* (2013.01); *H01M 2004/021* (2013.01); *H01M 2004/027* (2013.01)

(58) Field of Classification Search
None
See application file for complete search history.

(56) References Cited

U.S. PATENT DOCUMENTS

| | | | |
|---|---|---|---|
| 3,116,170 A | 12/1963 | Williams | |
| 3,222,224 A | 12/1965 | Williams | |
| 3,793,060 A | 2/1974 | Weininger | |
| 5,750,289 A | 5/1998 | Kejha | |
| 6,143,445 A | 11/2000 | Ferment | |
| 6,251,540 B1 | 6/2001 | Kejha | |
| 2006/0105243 A1* | 5/2006 | Okamura | H01M 4/64 429/234 |
| 2010/0330425 A1* | 12/2010 | Lopatin | H01M 4/62 429/220 |
| 2012/0315537 A1* | 12/2012 | Ravdel | H01M 4/668 429/209 |

OTHER PUBLICATIONS

Jun Liu, et al., "Pathways for practical high-energy long-cycling lithium metal batteries," Nature Energy, Mar. 2019, vol. 4, pp. 180-186, USA.
Gregor Hoogers, "Fuel Cell Technology Handbook," 2003, Chap. 2, CRC Press, USA.

* cited by examiner

*Primary Examiner* — Ula C Ruddock
*Assistant Examiner* — Tony S Chuo
(74) *Attorney, Agent, or Firm* — Stephen Joncus

(57) ABSTRACT

A battery using porous polymer materials with tapered or cone-shaped metalized pores. The types of batteries include, but are not limited to, Li—CoO2, Li—Mn2O4, Li—FePO4, Li—S, Li—O2, and other lithium cathode chemistries. The tapered metalized pores contain lithium metal in small reaction zones in the anode and cathode in a flexible structure. The form factor of such assembly would be very thin. Because of the thin form factor these electrodes would be suitable for batteries that require high power density, such certain electrical vehicles, power tools, and wearable devices.

5 Claims, 9 Drawing Sheets

POROUS POLYMER LITHIUM ANODE

BACKGROUND

Batteries generate electrical energy from a chemical reaction. Many different types of batteries have been designed for different applications and different needs. Batteries made of different materials have distinct performance characteristics in terms of energy density (watts/kg), power density (watts/m$^3$), cycle life, safety, and cost.

A battery is a device having one or more electrochemical cells. The positive terminal of a battery is the cathode. The negative terminal, the anode, is the source of the electrons that flow through an external circuit powering the device connected to the battery. During discharge of a battery, a redox reaction generates electrons that are supplied to a circuit as electrical energy.

Batteries are ubiquitous. The world-wide market is larger than $100 billion per year and growing at approximately 8% per year. Lithium batteries are the focus of intense research because lithium is the lightest of all metals (the density of Lithium metal density is only about half that of water) and has the most negative electrochemical potential (−3.05 V). Lithium batteries have other desirable characteristics. They typically discharge at a relatively constant voltage with little variation. Lithium batteries have a relatively long shelf-life with a low rate of self-discharge. Lithium batteries also have high Coulombic efficiency—most of a charge can be discharged to supply electric power.

The basic theory of a lithium battery involves the oxidation of lithium on the anode—the negative electrode. During discharge of the battery, a lithium atom gives up an electron to the circuit and the resulting Li+ ion transports through the electrolyte to the cathode. The cathode is typically a layered or honeycombed structure that permits the Li+ ions to fill into the spaces, or intercalcate, in the molecular structure of the cathode material. During charging of the battery, electrons are supplied to the negative terminal from a power supply or charger, in the case of lithium metal batteries, they react with Li+ ions to form lithium metal.

There are two basic version of lithium batteries: lithium metal and lithium ion. Lithium metal and lithium ion are distinguished based on the nature of the anode active material. Due to safety issues with lithium metal batteries, the most well-known and used form is the lithium ion battery with liquid electrolyte.

Lithium batteries were first developed in the 1970's and commercialized in the 1980's. The first lithium batteries had an anode made of Lithium metal and a cathode made of molybdenum sulfide. Lithium metal has a theoretically higher energy content, but the build-up of lithium on the anode during charging creates sharp projections called dendrites. These dendrites can grow and have the mechanical strength to puncture through the separator between the anode and cathode, causing a short circuit, heat generation, and potential fire.

These problems with the first lithium metal batteries caused them to be replaced by lithium ion batteries. Lithium ion batteries are the most commonly used type of lithium batteries today. In the case of lithium ion, the anode contains a structure that provides mechanical support that enables bonding of lithium in a charged state. Lithium ion batteries are designed to prevent the creation of lithium metal which prevents the formation of lithium dendrites. While several materials can be used as negative electrodes in lithium ion batteries, the most important material is graphite. Graphite has a layered structure that permits lithium ion insertion in the matrix of carbon to carbon bonds. During discharge, lithium gives up an electron, detaches from the graphite, and travels as a lithium ion (Li+) through the electrolyte to the cathode. Once reaching the cathode, the lithium ion intercalates between the layers of the cathode material.

There is demand for continuous improvement in battery technology. In current lithium ion batteries, certain cathode material chemistries provide relatively high specific energy and energy density. Yet the capabilities of modern electronic devices are still limited by the available battery capacity. While more energy can be obtained from lithium metal, lithium ion batteries predominate because of the historical safety problems with lithium metal batteries.

Traditional lithium ion batteries use an electrode design that have not improved much in decades. The anode is constructed using a special active mass, usually graphite, and with other additives; and pressing it or rolling it onto the thin metal sheet. While there are many different anode supports, most are based on some form of carbon, soft carbon, hard carbon, the most popular being graphite.

The basic properties of the anode for a lithium ion battery limit battery performance. Furthermore, the method of construction often leads to mechanical problems. The presence of graphite is also suspected to lead to issues with performance such as growth of an interphase layer with components of electrolyte decomposition. This layer over time slows down the reaction and contributes to loss of capacity after cycling.

As a result of numerous problems with current manufacturing methods for lithium ion batteries, there is a great need for innovation that would enable better performance, higher specific energy and energy density, and higher cycle life. The disclosed design provides a battery structure that safely utilizes the higher energy potential of lithium metal without the historical risk of uncontrolled reaction and fire.

SUMMARY

I have discovered a new lithium metal battery for storing electrical energy. The battery employs a plethora of small pores formed in a non-conductive polymer base material for both the cathode and anode. The internal pores walls are coated with a tapered metal layer that is thicker deeper in the pore to form a tapered or conical metalized pore. The pores in the flexible polymer substrate create easily accessible sites for active electrode battery materials, lithium metal on the anode, and a variety of possible cathode chemistries such as $LiCoO_2$. The active masses react, that is, they are oxidized or reduced in isolated reaction zones in the metalized pores of the polymer material. Because the pores are small and separated from each other, the reduction and oxidation of lithium metal occurs in small reaction zones to prevent past problems with lithium metal batteries such as those caused by: reactions that are too slow or have poor performance; reactions that are too fast, uncontrolled reaction that could lead to thermal runaway; or the formation of lithium metal dendrites that can create short circuits.

The form factor of this new lithium metal battery is very thin making it suitable for many potential applications that require high power density, such as certain electrical vehicles, power tools, and because of flexibility the wearable devices.

DESCRIPTION

Figure 1A:
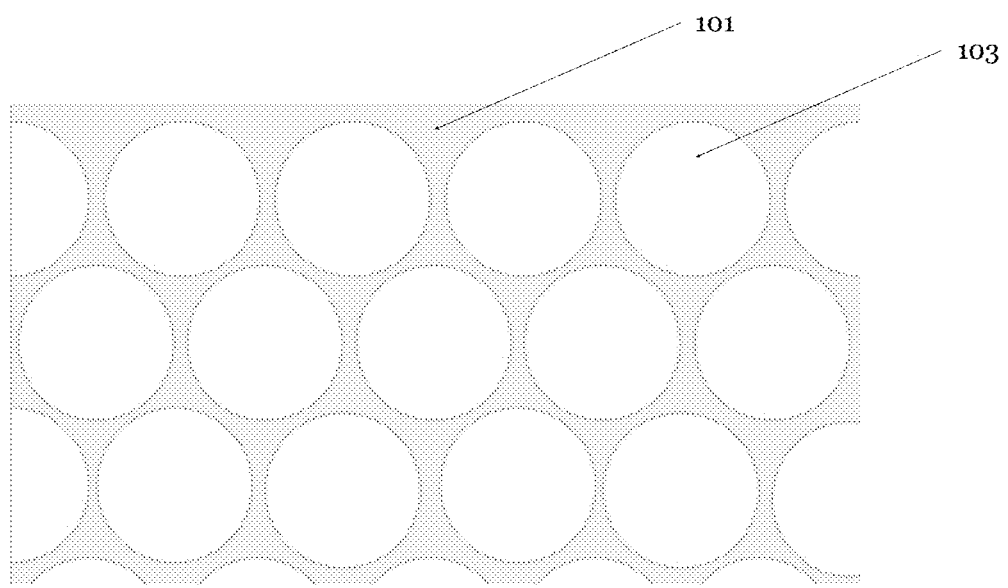
FIG. 1A is a plan view of a polymer sheet base material with pores.
Figure 1B:
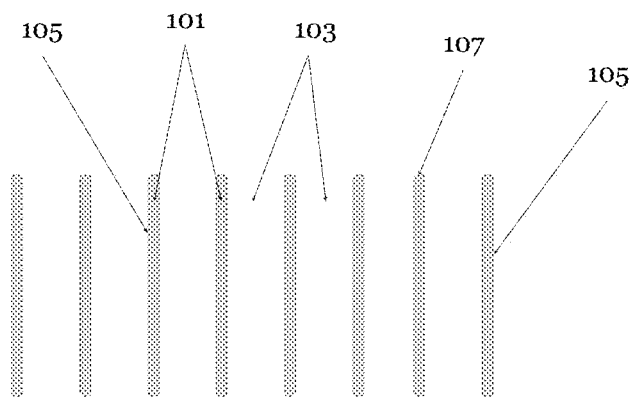
FIG. 1B is a cross section of a polymer sheet base material with pores.

The assembly of the new battery begins with thin porous polymer sheets 101 as the base material for both the cathode and the anode as shown in FIG. 1A and FIG. 1B. The thin polymer sheet may be made of, polyethylene, polypropylene, polytetrafluorethylene, polyvinyldene fluoride, polyethersulfone, or other similar materials. Each of these materials can be made into a porous form, with pores 103 arranged in a structured manner which means pores that are relatively uniformly distributed and have relatively consistent pore dimensions such as diameter and pitch. The pores can be formed in the polymer material using different methods, such as stretching thin films or by laser cutting. Ideally, the diameter for the pores 103 for the anode are about 20 microns with an edge between the pores that is 1 to 3 microns, creating a pitch of approximately 22 microns, but the pores 103 are not restricted to these dimensions. The pores 103 take up most of the area of the polymer sheet 101. The total volume of the pores in the porous polymer sheet 101 destined to be made in the cathode 401 often needs to be larger than the volume of the pores in the porous polymer sheet 101 destined to be made into the anode 301. Ideally, the thickness of the thin polymer sheet 101 for the anode and the cathode may each be 70-80 microns but is not restricted to this range. The design for the thickness of the polymer sheet 101 and the diameter of the pores 103 can be adjusted as needed for the intended use of the battery. If higher energy is desired, then a thicker polymer sheet 101 may be utilized; if designing for greater power, a thinner polymer sheet 101 may be utilized. The pores 103 are cylindrical, or another column-like shape, with walls 105. The edge 107 between the pores is minimized to be a much smaller surface area than the total surface of the pore walls 105 and to maximize the volume available for the active mass while retaining mechanical stability.

Figure 1C:
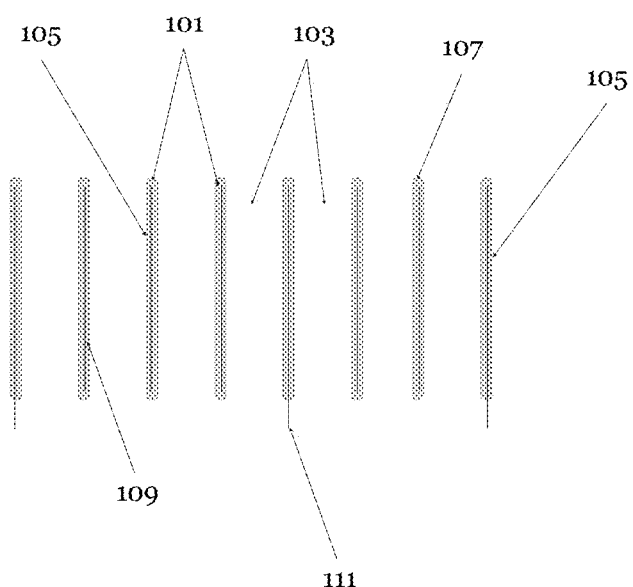
FIG. 1C is a cross section of another embodiment of a polymer sheet base material with pores.

Another way of forming a flexible and porous polymer sheet 101 is to use a wire mesh 109 of an appropriate size to form pores 103 of the same dimensions identified above, i.e., ideally 20 microns in diameter and 70-80 microns deep. Such a metal reinforced polymer has multiple benefits, including that it generates very structured pores, enhances mechanical stability while maintaining flexibility. The wire mesh is coated with a high-dielectric polymer such a Paralyne to create the polymer base material, as shown in FIG. 1C which can be metalized to form an anode 301 and cathode 401 as further described below. The wire mesh 109 is encased in the Paralyne except in stragic locations there are electrode leads 111 for connection to the external circuit.

The relative size of the pores for the anode 301 and the cathode 401 will depend on the specification for the particular energy content of the cell or battery which will determine how much lithium needs to be available in the cathode active mass 403 to meet the performance requirements for the cell or battery. For some cathode chemistries, the volume needed to contain the cathode active mass 403 in the cathode 401 will be larger than needed to contain the lithium that plates out as lithium metal in the pores 103 for the anode 301.

Figure 2A:
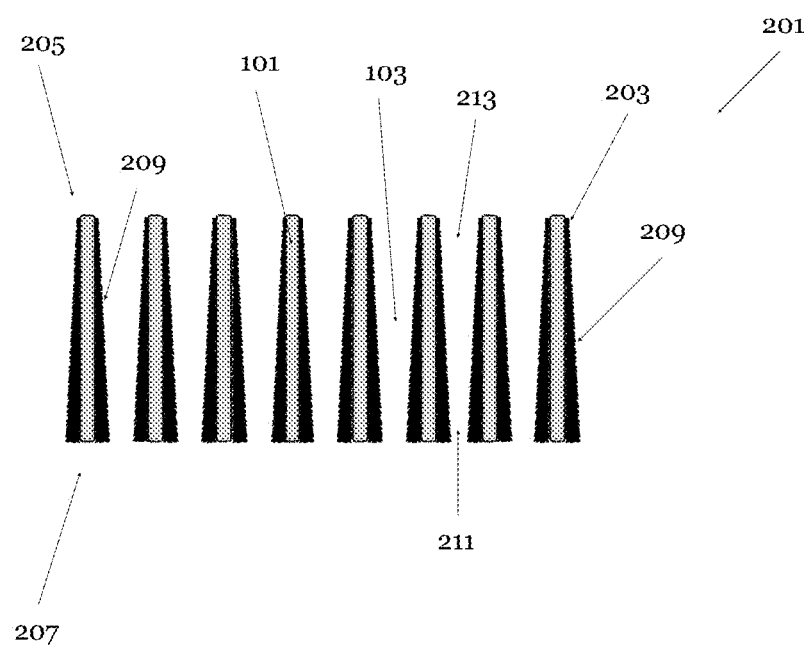
FIG. 2A is a cross section of a polymer sheet base material with metal deposited in the pores.

An electrode 201 that will form the basis for assembly of both of the anode and cathode, is created by first depositing a metal layer 203 throughout the porous polymer structure 101 and particularly coating the pore walls 105 as shown in FIG. 2A. Each electrode 201 has an opposing electrode facing surface 205 and a backside 207. Metal deposition can be accomplished using a number of different methods such as electroless metal deposition, chemical vapor deposition, atomic layer deposition and other known methods to those experienced in the art. The deposition process is tuned to create a tapered deposition in the shape of a funnel 209 on the walls of the pores 105 such that the thickest layer of metal material in the pores 103 is at the base of each pore 211 proximate to the backside 207. The thinnest part of the funnel 209 is at the top of each pore 213 proximate to the opposing electrode facing surface 205. Depositing metal in the form of a funnel 209 in the pores 103 encourages the lithium to travel deep into the pores 103 to the base of the pore 211 before being reduced and plating out as lithium metal. The thicker the metal deposition at a location, the lower the electrical resistance. Lithium ions are more attracted to locations with thicker metal deposition due to the lower electrical resistance. Tapering the metal deposition in a pore therefore encourages the lithium ions to travel deeper into the funnel 209 and deeper into the pore 103 before oxidizing and forming lithium metal during charging.

The tapered metal funnel 209 is also desirable for the electrode 201 that will be used to form the cathode 401 to similarly encourage the lithium ions to travel deep into the cathode active mass 403. The amount of taper of the tapered metal funnel 209 may range from no taper at all (where the diameter of the opening at the top of each pore 213 is the same as the diameter of the opening at the bottom of the pore 211) to completely closing off the pore at the base of the pore 211 as shown in FIG. 2C. Depending on the design objectives of the cell, the taper may be such that after metalization the area of the opening at the base of the pore 211 may be specified to be about 80%, 64%, 49%, 36%, 25%, 16%, 9%, 4%, or 1% of the area of the opening at the top of the pore 213.

In the case of a wire reinforced polymer sheet 101 as shown in FIG. 1C, the deposited metal for the tapered metal funnel 209 will come in contact with the electrode leads 111 which facilitates superior conductivity between the metalized pores and the external circuit which is a significant advantage of using a metal reinforced polymer sheet 101 as the base material.

Figure 2B:
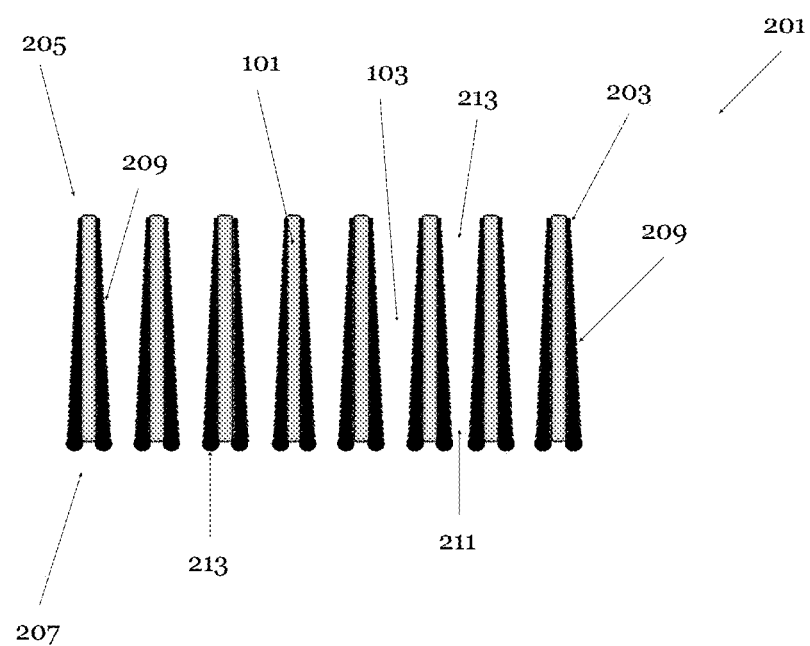
FIG. 2B is another embodiment of a cross section of a polymer sheet base material with metal deposited in the pores.
Figure 2C:
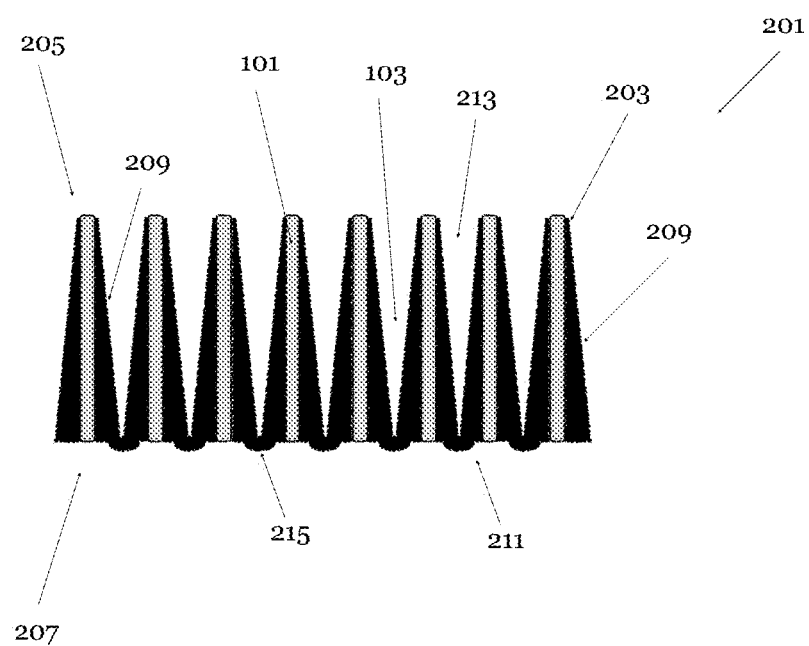
FIG. 2C is another embodiment of a cross section of a polymer sheet base material with metal deposited in the pores.

Optionally, the metal deposition can include a lip 213 at the base of the pore 211 as shown in FIG. 2B to improve the electrical connection between the electrode and the external circuit. If the metal deposition is tapered to the extent that it completely closes off the opening at the base of the pore 211, it is desirable to create a metal mushroom 215 as shown in FIG. 2C that protrudes from the backside 207 at each pore 103 to improve the electrical connection between the electrode and the circuit.

Ideally, if using atomic layer deposition, metal is not deposited on the opposing electrode facing surface 205. It is not needed or desirable to apply metal to the opposing electrode facing surface 205. But not all metal deposition processes can be tuned to avoid depositing metal on the opposing electrode facing surface 205. To the extent that metal is deposited on the opposing electrode facing surface 205, there needs to be a form of electrical insulation applied to electrically isolate the anode from the cathode and to prevent short circuits.

The metal layer 203 can be composed of a single metal or of multiple layers of different metals. For example, a first metal can be applied for good adhesion to polymer, followed by an intermediate metal and the final metal on which the reactions will occur. The metal layers 203 do not need to be perfectly uniform and pinholes in metal layer would not have significant negative effect on the performance. The metal layers may be nickel, copper, titanium, gold, silver, but also other conductive layers such as carbides or nitrides. After metalization, an electrode 201 that forms the basis of the anode and cathode is completed.

Figure 3:
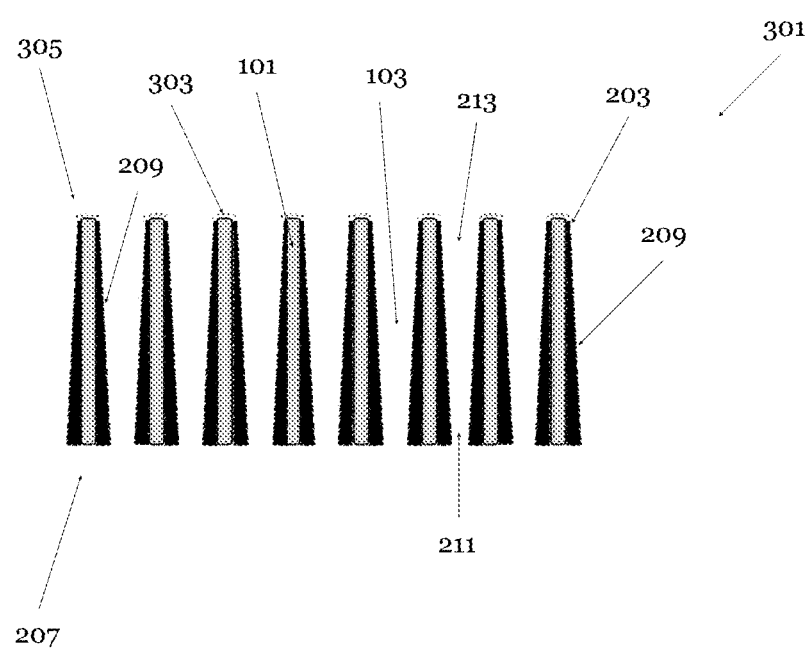
FIG. 3 is a cross section of an anode.

To form an anode 301 from the electrode 201 the cathode facing surface 305 of the anode 301 is passivated by applying a non-conductive material 303 as shown in FIG. 3. This step may be optional if metal was not deposited on the cathode facing surface 305 during the metal deposition process. The passivation of the cathode facing surface 305 with a non-conductive material 303 prevents lithium reduction on the cathode facing surface 305 and forces the lithium to travel into the pores 103 before being reduced and plating out as lithium metal. By passivating the cathode facing surface 305 between the pores 103, lithium plating can only occur inside the pores 103 and on the tapered metal funnel 209 on the pore walls 105. As described above, the shape of the metal funnel 209 in the pores (and correspondingly the conductivity of the metal surface at various depths in the pores) can be tailored through the deposition process so that lithium plating can be encouraged to occur first at the base of the pores 211. When the initial lithium plating takes place at the base of the pores 211, the pores 103 fill from the base 211 up, with lithium metal plating on the tapered metal funnel 209 filling the pores 103 from the bottom to the top.

Figure 4:
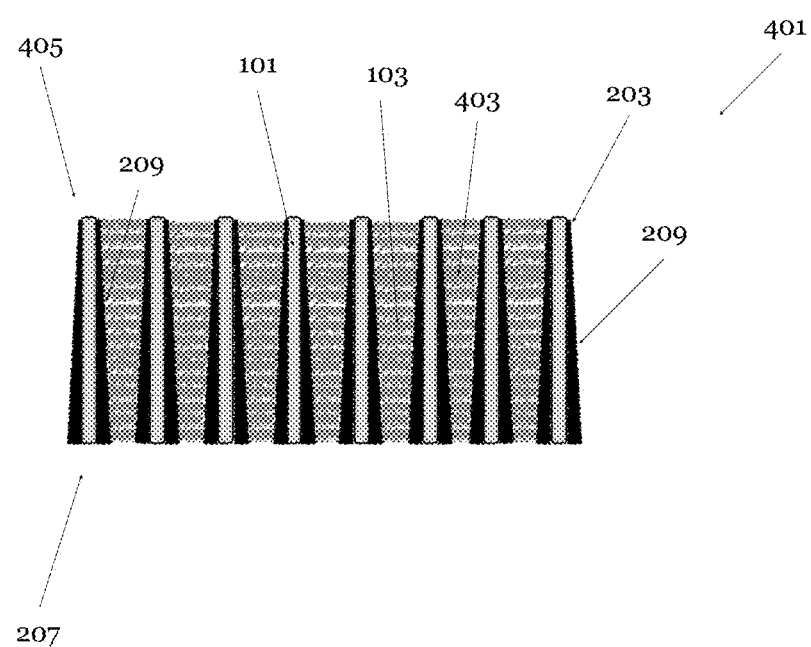
FIG. 4 is a cross section of a cathode.

Passivation can be accomplished with different treatments using non-conductive polymers such as selective polymer deposition. Some polymers, such as Paralyne (and in particular Paralyne C and Paralyne F), can be deposited with room temperature vacuum deposition only on the cathode facing surface 305 and slightly (20-30 microns) into the mouth of the pores. With passivation of the cathode facing surface 305 and the funnel shaped metal deposition 209 inside the pores 103, the reduction and formation of lithium metal is directed towards the base of the pores 211. After the passivation, the electrode 301 shown in FIG. 3 is a completed anode. The electrode 201 is also the basis for creating a cathode 401 as shown in FIG. 4.

For the cathode 401, passivation of the anode facing surface 405 with a non-conductive material 303 is optional. It is preferred that the anode facing surface 405 is not passivated. To form the cathode 401, a cathode active mass 403 is deposited to fill the pores 103 having the tapered metal surface 209. The cathode active mass 403 can be inserted in the pores 103 of the cathode 401, by a number of methods: flow-deposition, hydrothermal method, atomic layer deposition, spray pyrolysis, conformed electrodeposition, pulsed laser deposition, or by in-situ synthesis of cathode active mass 403. The preferred method is in-situ synthesis of the cathode active mass 403 by suspending the cathode 401 in a solution during the synthesis of the cathode active mass. As the cathode active mass material precipitates from the solution, it fills the pores 103 to form the cathode active mass 403. To the extent that the cathode active mass material precipitates on the anode facing surface 405 or the backside 207, it will wash off when the cathode 401 is removed from the solution. The cathode active mass 403 can be made from known cathode active mass materials for lithium batteries including, but not limited to: lithium cobalt oxide (LCO), lithium manganese oxide (LMO), lithium iron phosphate (LFP), lithium aluminum oxide, lithium nickel manganese cobalt oxide (NMC), and lithium nickel cobalt aluminum oxide (NCA) and lithium sulfur. Optionally, a conductivity enhancer consisting of metal powder can be added to the solution during the in-situ synthesis so that it becomes part of the precipitated cathode active mass 403. A conductivity enhancer may also be added during other methods of depositing the cathode active mass 403 in the pores 103.

Figure 5:
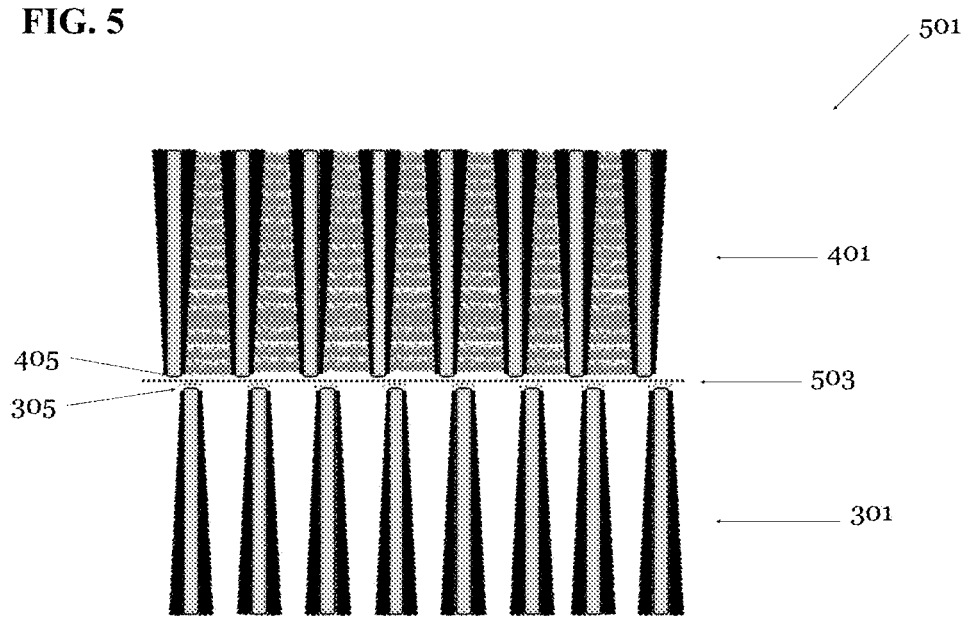
FIG. 5 is a cross section of a battery cell.

A cell assembly 501 is formed by layering the cathode 301 and the anode 401 together with the anode facing surface 405 of the cathode 401 facing the cathode facing surface 305 of the anode 301 facing each other as shown in FIG. 5. The passivated surface 303 of the anode provides sufficient separation of the positive and negative electrodes that a separator is not needed. Alternatively, if there was no metal deposition on the cathode facing surface of the anode 305, then no separator may be needed. Optionally, for extra safety, a sheet 503 can be placed between the anode 301 and the cathode 401. The sheet 503 may be a conventional separator that allows lithium ions to pass through but is electrically insulating. A conventional separator is a dielectric porous material that prevents electrical contact between the anode and the cathode, while allowing free permeation of electrolyte and transfer of lithium ions. A typical porosity of a conventional separator is between 30% and 60% and is 20-30 microns thick. The separator is also a polymer and some of the polymers known by those skilled in the art are the same materials as the polymers used for polymer sheet 101 used for the electrodes, such as polypropylene and polyethylene. Most commonly, the separator is made of polyolefin. Alternatively, and optionally, the sheet 503 can be a thin layer of solid electrolyte, that again allows the lithium ions to pass through but is electrically insulating. The solid electrolyte may be selected from the following types or families of electrolyte products including, but not limited to: sodium super ionic conductor (NASICON), garnet $Li_7La_3Zr_2O_{12}$ (LLZO), crystalline perovskite type lithium lanthanum titanate ($Li_{0.5}La_{0.5}TiO_3$) (LLTO), lithium super ionic conductor ($Li_{2+2x}Zn_{1-x}GeO_4$) (LISICON), LiPON $Li_2PO_2N$, $Li_3N$, sulfide, argyrodite, and antiperovskite.

The electrical connections between the anode 301 and cathode 401 and the external electrical circuit are made in the same manner as conventional lithium ion cells. A liquid electrolyte is also added in the same manner as conventional cells. The cell assembly 501 is placed in a pouch, air is evacuated, and liquid electrolyte is inserted to soak the cell assembly 501. The liquid electrolyte can be chosen from the standard liquid electrolytes used in lithium ion batteries.

There are some recent anode materials that involve silicate or LiSi alloys and TiO2 mixed with lithium. These materials can also be used with the disclosed battery design as anode active masses in addition to lithium metal. The porous polymer lithium battery structure will provide improved environment for these anode chemistries as well. For example, the most serious problem with silicon anode (LiSi) is extraordinary expansion and contraction during cycling, as lithium goes in and out of the anode. These large variations of volume over time create mechanical instability and lead to loss in cycle life. By using the porous polymer lithium battery structure, the reaction takes place inside the pores, which restrict the expansion and retain the shape and volume during contraction, providing thereby mechanical stability to the electrode and longer cycle life.

Multicell batteries, with the cells wired either in parallel or series can be created using conventional methods used for lithium ion batteries. The final structure can be bent or rolled if necessary for assembly in a desired shape or to fit into a cylindrical cells such as conventional Li-ion battery cells 18650 or 21700, where the first two digits give the diameter and last three the length of a cylinder in mm.

What is claimed is:

1. An anode comprising:
   a porous polymer anode base material having a cathode facing surface, an anode backside surface, and pores with internal anode pore walls; and
   a coating of conductive material on said anode backside surface, and on said internal anode pore walls;
   a passivation layer on the said cathode facing surface;
   said internal anode pore walls have a proximate end, proximal to the cathode facing surface and a distal end, proximal to the anode backside surface;
   the said coating of conductive material applied to the internal anode pore walls is tapered to be thicker at the said distal end than the proximate end.

2. The anode of claim 1 further comprising:
   said coating of conductive material at said distal end fills the distal end to block the opening in the distal end of the pore.

3. The anode of claim 1 further comprising:
   the coating applied to the internal anode pore walls is tapered sufficiently such that lithium metal formation at the said proximate end of said pores will not block the entrance of lithium ions into the pore before the pore is filled with lithium metal.

4. The anode of claim 1 further comprising:
   the coating applied to the internal anode pore walls is tapered sufficiently such that lithium preferentially plates on said distal end.

5. The anode of claim 1 further comprising:
   said porous polymer anode base material has structured pores.

* * * * *